Aug. 22, 1950  D. W. GRANT  2,519,426
ALTERNATING CURRENT CONTROL DEVICE
Filed Feb. 26, 1948  2 Sheets-Sheet 1
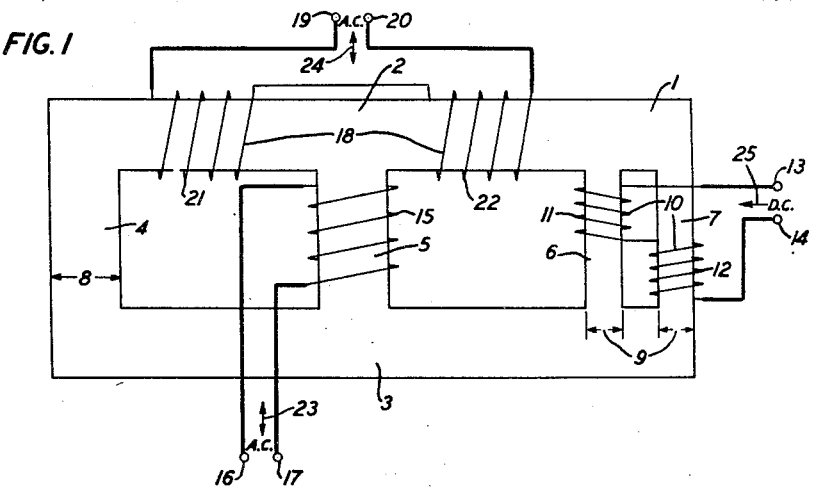
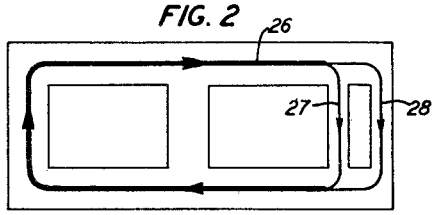
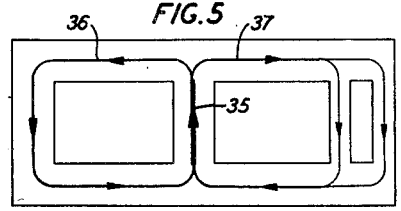
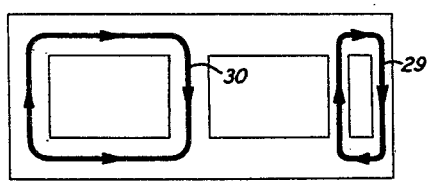
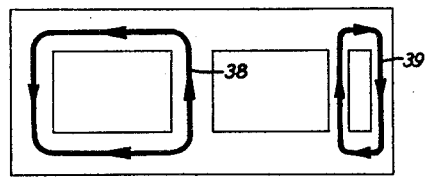
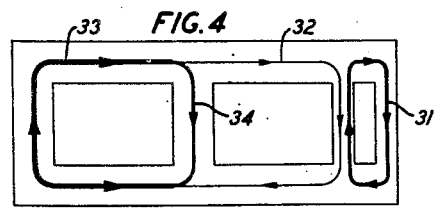
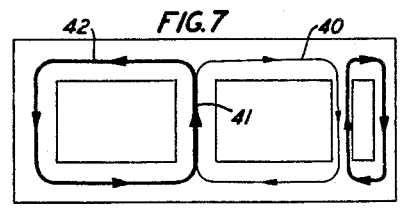
INVENTOR
D. W. GRANT
BY
P. C. Smith
ATTORNEY

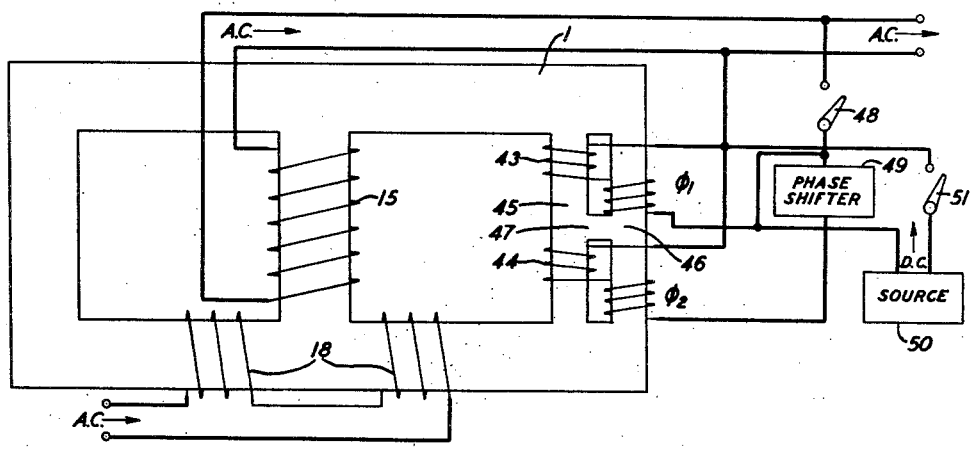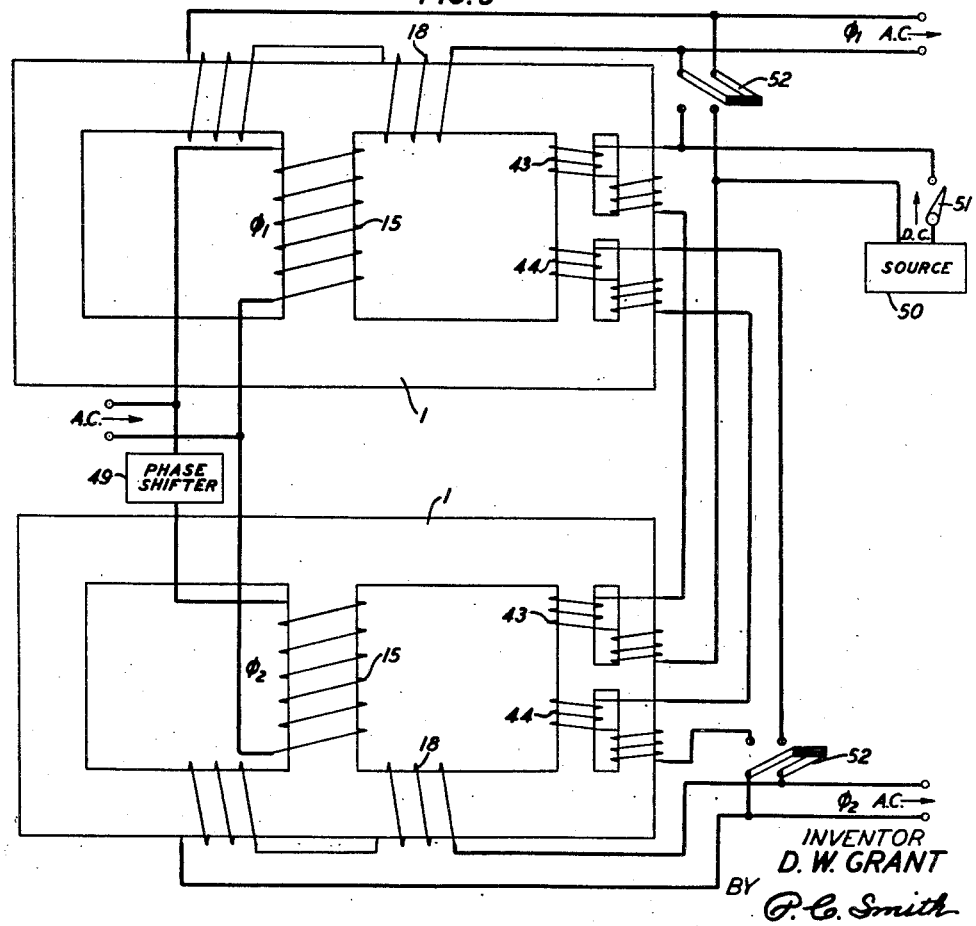

Patented Aug. 22, 1950

2,519,426

UNITED STATES PATENT OFFICE 2,519,426

ALTERNATING CURRENT CONTROL DEVICE

Dwight W. Grant, Bloomfield, N. J., assignor to Bell Telephone Laboratories, Incorporated, New York, N. Y., a corporation of New York Application February 26, 1948, Serial No. 11,007

11 Claims. (Cl. 323—56)

This invention relates to alternating current control devices and particularly to alternating current transmission controllers having no moving parts.

The invention is concerned generally with those alternating current transmission control devices commonly referred to as transformers. In particular, the present invention relates to alternating current transformers wherein the electromagnetic coupling from the well-known primary winding to an associated secondary winding is controlled from zero coupling to a substantial amount of coupling without necessitating any moving parts or spe'ial foreign structure associated directly with the structure of the transformer.

The present invention may be likened to such well-known devices as vacuum tubes or similar devices wherein normally there exists no coupling between an energized input circuit and an associated output circuit and wherein a control element or circuit is energizable to create a coupling therebetween.

It has been known for some time that two alternating current windings may be arranged upon a magnetic structure, commonly known as a core, such that there is normally a controllable electromagnetic coupling between said windings. At least one known means of controlling this coupling is to employ a third winding on said core structure, which third winding is energizable by a control current to produce in said core an additional component of magnetic flux for the purpose of altering the reluctance of the core structure linking the alternating current windings. The change of reluctance of the core structure linking said alternating current windings effectively changes the coupling therebetween.

The latter type of prior control devices have been generally of two varieties. One variety comprises that type of structure wherein there always exists an appreciable amount of coupling between the alternating current windings irrespective of the amount of control flux produced in the core of said structure. Therefore this variety of device is incapable of effecting switch action in the transmission of alternating current energy between said windings and is limited in application to those uses which require a continuous transmission of energy, controllable as to finite magnitude.

It is one object of the present invention to produce a structure of the general type discussed above but which is capable of effecting switch action in the transmission of the energy.

A second variety of the prior types of such control devices comprises that type of structure wherein the coupling between alternating current windings, or transmission therebetween of energy, is controllable to such an extent that there will be no output or a variable output, the latter being characterized generally as a peaked wave. In this variety of the known devices, as well as in the first-mentioned variety, the control flux produced in the core structure has been required to link the alternating current windings. This condition dictates that the alternating magnetomotive force operate near or at the well-known "knee" of the magnetization curve of the particular magnetic material of which the core structure is constructed. It is, of course, well known and appreciated that the slope of the magnetization curve in the latter region changes rapidly from large to small, and vice versa, such that the output derived in the form of flux for a given driving force is low, not to mention that it is considerably distorted due to the rapidly changing slope of the curve which represents the permeability of the magnetic material.

It is an object of this invention to effect switch action control of such transmission of energy without requiring the control flux, which effectively creates the coupling between the alternating current windings, to traverse core structure which is linking said alternating current windings.

A further structure is known wherein the primary and secondary windings of a transformer are arranged on a core structure such that normally there would be coupling therebetween except that permanent magnets are interposed in the core structure linking said windings to normally saturate said core to prevent effective coupling between said windings. Also said alternating current windings have been arranged such that there is at all times a fair degree of coupling therebetween due to air paths. A third winding, energizable by unidirectional current for instance as a control means, is disposed on the core structure such that the unidirectional flux produced thereby in said core neutralizes the permanent bias produced by the permanent magnets, to thereby enable switch action control. The unidirectional neutralizing flux is advantageously confined within the core such that it does not link the alternating current windings. However, this structure, as will be appreciated, is not homogeneous and therefore is expensive and somewhat difficult to manufacture economically, particularly in view of the necessity for balanced permanent magnets, at least two being required to maintain the symmetry of magnetic structure.

It is an object of this invention to provide the advantages of the latter known structure without the necessity of using any form of permanent magnetic bias in the core structure, without necessitating that the control flux link the alternating current windings and so disposing all windings such that normally there is no coupling therebetween due to either core path or air paths. A homogeneous and thus an easily and economically manufactured transformer structure is provided which affords all of the operational features of the prior art while at the same time eliminating or inhibiting the several disadvantages of each of the generally known varieties of known control devices of the character described.

Briefly the invention contemplates a homogeneous magnetic core structure having no permanent magnetic bias therein, upon which unbiased core are arranged two alternating current windings so disposed that normally there exists no electromagnetic coupling therebetween when one of said windings is energized. A third winding is arranged upon said core, energizable by control current and so disposed on said core that the control flux produced thereby in the core does not link the two alternating current windings but which is effective to create coupling between said two windings.

In this specification and appended claims whenever the expression "unbiased core," or the equivalent, is used it is intended to mean a core structure having therein no intentional permanent magnetism, produced by permanent magnets or by electrical means, which is conveniently referred to as a biasing flux or just simply a bias. Of course, due to the nature of the well-known hysteresis loop there may be at some time of zero magnetomotive energization a small degree of residual magnetism in said core. This type of permanent magnetism, if existing, is not considered as intentional bias.

Instead of requiring the continued use of the unidirectional current source as a control means, part of the output of the device may be utilized as a control current after the initial coupling has been effected. This feature of the invention is analogous to the well-known holding windings of an electromagnetic relay. This aspect of the invention is fully explained in the subsequent specification. In regard to the latter, reference is made to the application of D. S. Barlow, Serial No. 10,945, filed February 26, 1948, and patented concurrently herewith, and concerning broadly the above feedback means of locking the control of such a device as disclosed herein. Barlow discloses and claims this locking control in its broad sense.

Preferred embodiments of the invention are illustrated in the drawing accompanying this specification of their structure and functioning. Further objects and advantages of the invention will be appreciated from the following detailed description of said preferred embodiments, reference to be made, from time to time, to the drawings, the various figures of which are generally described as follows:

Fig. 1 shows a preferred structure of a control device embodying the invention;

Figs. 2, 3 and 4 are schematic representations of various flux conditions in the core structure of Fig. 1 at various times of interest to be mentioned later;

Figs. 5, 6 and 7 are schematic representations of other flux conditions at other times, as hereinafter explained;

Fig. 8 shows one form of the invention wherein part of the output of the device is utilized to maintain the coupling between alternating current windings; and Fig. 9 shows a modification of the device shown in Fig. 8.

Referring to Fig. 1, a transformer core, indicated generally by reference numeral 1, is constructed of the shape shown having a suitable thickness. Core 1 is made of a homogeneous magnetic material, such as soft iron or of well-known Permalloy, arranged as a solid structure, a laminated structure or other manner of construction known to those skilled in the art. It is convenient to describe the embodiment shown as a core 1 consisting of two main arms or legs 2 and 3 magnetically interconnected by four parallel magnetic circuits comprising auxiliary arms or legs 4, 5, 6 and 7. The reluctance of leg 4 is substantially equal to the combined effective reluctance of legs 6 and 7 in parallel. This generally may be considered true if the width 8 of leg 4 is equal to twice the width 9 of leg 6 or of leg 7, the widths 9 being of course substantially equal. The requisite necessary for the successful use of the embodiment shown is that the reluctance presented to the flow of magnetic flux by leg 4 should equal the reluctance presented to the same flux by the effect of legs 6 and 7 in parallel magnetic paths or circuits when there is no saturating flux in either of said legs.

A winding 10 is arranged upon legs 6 and 7 such that equal fluxes flowing in the same direction in legs 6 and 7 at the same time will induce in the respective portions 11 and 12 of winding 10 equal and opposite voltages, which voltages will neutralize or cancel each other with reference to the voltage available thereby at terminals 13 and 14. Due to the symmetry of the parallel magnetic paths comprising legs 6 and 7 any flux therein produced elsewhere in core 1 will divide equally into legs 6 and 7 and will therefore have no inductive effect upon winding 10 as a whole. If the magnetic paths comprising legs 6 and 7 are structurally symmetrical then the number of turns on winding portion 11 and 12 should be substantially equal. These legs 6 and 7 may exhibit a dimensional dissymmetry provided the numbers of turns of winding portions 11 and 12 are similarly arranged to comply with the above-mentioned cancelling of induced voltage and provided the effective reluctance of legs 6 and 7 in parallel is equal to the reluctance of leg 4.

Another winding 15 is arranged as shown upon core leg 5 and terminates at terminals 16 and 17.

Still another winding 18, with terminals 19 and 20, is arranged as shown upon main arm 2 of core 1 such that any voltage induced in winding portion 21 of winding 18 as a result of flux linking said winding portion due to a magnetomotive force produced elsewhere in said core structure will neutralize, with regard to terminals 19 and 20, the voltage induced in winding portion 22 of winding 18 as a result of an equal flux linking winding portion 22 in the opposite direction in main core arm 2.

The arrows 23 and 24 indicate that alternating current may be supplied to or derived from either of windings 15 or 18, one winding having said current supplied thereto while the other is having said current derived therefrom, or vice versa.

The arrow 25 indicates that a control current may be supplied to winding 10. This control current is preferably direct current but is not necessarily limited thereto as the embodiment will function for its useful purpose whenever winding 10 is energized for a period of time by any suitable form of unidirectional current as will be appreciated from this disclosure.

Normally winding 10 is not energized. Either winding 18 or winding 15 may be used as the primary alternating current winding. Figs. 2, 3 and 4 show the flow of flux in core 1 under three different conditions when winding 18 is the primary winding (the winding which is supplied with alternating current from a source not shown). Figs. 5, 6 and 7 show flux flow in core 1 when winding 15 is the primary winding under similar conditions to the laterally adjacent Figures 2, 3 and 4.

As shown in Fig. 2, when winding 18 is energized, each portion thereof, namely portions 21 and 22, aid each other in producing an alternating flux 26, which may split equally into fluxes 27 and 28 in legs 6 and 7 of core 1 and which due to the electromagnetic symmetry of the arrangement does not traverse leg 5. Depending upon which way one looks at the phenomenon, it may also be conidered that each portion 21 and 22 of winding 18 effects its own flux in leg 5. However, these two fluxes will be equal and opposite to thereby cancel and produce effectively no flux linking the winding 15 on leg 5. Thus normally there is no electromagnetic coupling between windings 15 and 18, either via the structure of core 1, or by air paths if it is desired to orient the axes of these windings perpendicular to each other as shown. Under most circumstances the core structure will confine the great majority, if not all, of the flux so that orientation of the windings as mentioned is not necessary to use of the invention, but may be considered the preferred disposition.

Under normal circumstances, due to the relative induction effects of portions 11 and 12 of winding 10 on legs 6 and 7 as discussed above, the fluxes 27 and 28 traversing legs 6 and 7 will have a zero cumulative inductive effect on winding 10. Thus there is no electromagnetic coupling between windings 18 and 10, which condition, as above in regard to windings 18 and 15, may be assisted or insured by disposing the axes of windings 18 and 10 perpendicular to each other as shown.

In Fig. 3 is shown the resultant flux flow in core 1 when winding 10 is energized by direct current to saturate the core legs 6 and 7 and the core portions interconnecting same. Due to the fact that the magnetomotive forces developed by portions 11 and 12 of winding 10 in respective legs 6 and 7 are equal and opposite, there will be effectively no magnetomotive force available to drive direct current flux anywhere else in core 1, and only as shown by flux 29 of Fig. 3. The permeability of legs 6 and 7, when saturated by flux 29, will be substantially zero to passage of the alternating flux which, as shown by flux 30, will be forced to confine its path to legs 4 and 5. Thus a coupling is effected between windings 18 and 15 whereby alternating current may be derived from winding 15.

In regard to Fig. 4, if the direct current flux 31 is not sufficient to fully saturate core legs 6 and 7 the permeability of one leg or the other will be high for passage of a portion 32 of the alternating flux 33 depending on which polarity of alternating flux is viewed instantaneously. The alternating flux 32 will traverse that leg, 6 or 7, in which the direct flux 31 is at the moment opposed to the desired direction of flow of flux 32. Thus it is seen that only a part 34 of the flux 33 will link winding 15 on leg 5; however, that part 34 is sufficient to effect the desired coupling.

It will, of course, be appreciated that as soon as winding 10 is deenergized the aforementioned coupling between windings 18 and 15 will disappear due to the magnetic symmetry represented by the flux flow of Fig. 2.

In order to clearly indicate the import of such figures as 2 through 7 it should be observed that the flux flows indicated by the various arrowed lines represent instantaneous pictures of the alternating flux, the control flux, of course, being of a unidirectional nature. The directions of the latter alternating current fluxes change periodically but it will be understood that the functioning of the control device as a whole is not changed thereby sufficiently to necessitate added descriptive matter concerning the periodic change of direction of the flux flow lines.

Figs. 5, 6 and 7 show flux flow conditions for the same condition of energization of winding 10 as their laterally adjacent Figs. 2, 3 and 4 when winding 15 is supplied with alternating current as the primary winding. In Fig. 5 the alternating flux 35 will divide into two substantially equal portions 36 and 37, when winding 10 is not energized. Fluxes 36 and 37 will induce in winding 18 equal and opposite voltages to thereby prevent coupling between windings 15 and 18. When winding 10 is energized, as per Fig. 6, the alternating flux 38 will be forced to traverse only legs 4 and 5, due to saturation of legs 6 and 7 by the direct flux 39. Thus windings 15 and 18 become coupled. Lastly, with regard to Fig. 7, when winding 10 is not energized sufficiently to fully saturate legs 6 and 7, part 40 of the alternating flux 41 will traverse either leg 6 or leg 7, depending on its polarity, and the remaining greater part 42 of the alternating flux 41 will couple windings 15 and 18.

With regard to a comparison between the flux conditions shown in Figs. 2 and 4 and between 5 and 7, the amount of unidirectional energization supplied to winding 10 will to a degree determine the amount of coupling flux which links both windings 15 and 18. Thus the present invention not only provides a control device with an unbiased core structure which can provide switch action to the transmission of alternating current energy between alternating current windings without necessitating a control flux linking the alternating current windings, but also enables a control over the amount of said coupling between zero and a substantial amount. This aspect of the invention suggests its use as a modulation device wherein the control flux may be varied in amplitude to effect varying degrees of coupling between the alternating current windings. The latter premise necessitates a magnetic core structure which has a continuously changing permeability with a change in magnetomotive energization. This characteristic is inherent in many commonly available magnetic materials.

It is particularly to be understood that the core 1 has no special and intentional foreign or extraneous structures contained therein or attached thereto or special electrical winding thereon to produce a permanent magnetic bias therein as was the case with the prior art referred to above. The present invention produces an alternating current control device for providing switch action to transmission of said current without moving parts and without such a somewhat complicated and expensive core structure. The present invention relies for its merit upon structural arrangement and disposition of winding alone, including of course all known benefits of the art.

In addition it is purposeful that at no time or under no condition is the control flux, which actually creates the desired coupling, required to link the alternating current windings coupled thereby. The advantages of this purposeful arrangement have been set forth above and derive from the aforementioned structural arrangement and winding disposition comprising this invention.

Referring now to Fig. 8, two control windings 43 and 44 have been arranged on legs 45 and 46 of core 1, the legs 45 and 46 being joined substantially at the respective mid-sections thereof by a core portion 47. Winding 18 is used as the input winding and winding 15 as the output. These windings may be reversed as to function as has been explained hereinbefore. Each of the control windings 43 and 44 is energizable from the output winding, 15 in this case, by means of a switch 48. One of the windings 44 is altered in its phase relationship to the other winding 43 by means of a phase shifting means 49, which for example may be as simple as a single condenser. In other words winding 43 is energized directly by winding 15 and winding 44 is energized by winding 15 in series with means to create a phase shift therein. Of course other known phase shifting means may be utilized equally well as the exemplary condenser. A source 50 of unidirectional current may be used by means of a switch or switches 51 to supply initial control energization to either or both of windings 43 and 44 as previously explained.

Since the currents in windings 43 and 44 are out of phase, if continuous control is to be derived from this type of feedback, either one or the other of the winding currents must be at any instant not less than the amount of unidirectional or direct current initially required to saturate either or both of the legs 45 and 46. If $I_{dc}$ represents the direct current initially required for coupling, then it results that the instantaneous current in one or the other of the feedback windings, assuming sine waves of energizing current, must not be less than $I_{dc}$ and that for two such feedback windings 90 degrees out of phase with each other the root means square value of each control winding current $I_{rms}$, must be not less than $I_{dc}$. Similarly the required value of alternating feedback current can be determined for any degree of phase shift except theoretically that phase shift which results in all out of phase currents becoming zero at the same given instant. Also it is well known that the energizing currents will not be pure sine waves and allowance must be made for this condition. The essential consideration is that the transition from one current wave to the other must be such as not to permit both currents to be lower at any given instant than the value required for saturation. Likewise there may be more than two feedback windings with at least two of them out of phase. All the foregoing conditions of numbers of control windings and phase displacement are theoretically possible but, as will be appreciated, some conditions will necessitate excessively large feedback voltages.

As will be appreciated from previous discussion concerning Figs. 1 and 8, the control winding arrangement shown in Fig. 8 could be easily employed as the control means in accordance with the operation of the device of Fig. 1. Likewise, such a core structure as shown in Fig. 8 could contain only one control winding physically linking only the core portion 47 and such an arrangement would be equivalent to the arrangement shown in Fig. 1 as to its electrical and electromagnetic functioning, differing only as to physical rearrangement.

Fig. 9 shows a rearrangement of the concept of continuous split-phase feedback control previously discussed with regard to Fig. 8. Two cores 1 are shown, each having two control windings 43 and 44, an input winding, 15 in this case, and an output winding 18.

The phase shifter 49 is interposed in circuit with one of the input windings 15 in this modification instead of being in circuit with the control winding energization paths. The output currents of the two cores 1 are out of phase in this arrangement, this being represented by an output of phase 1, $\Phi_1$ at the top, and an output of phase 2, $\Phi_2$ at the bottom of Fig. 9. Each phase energizes one of the two control windings, such as 43 for $\Phi_1$, on each core 1 and the other phase energizes the other control winding, such as 44 for $\Phi_2$, by means of switches 52 or the equivalent. A unidirectional source 50 is again necessary to initiate the control of coupling by means of a switch 51.

It will be appreciated that more than two separate cores 1 can be used in accordance with the arrangement of Fig. 9. If three were used, there would, of course need be only two control windings for each core as previously; however, three such windings for each core could be successfully employed, if desired.

Uses and applications of embodiments of the invention are numerous. The salient and more obvious uses for such a control device are such as replacement for relays and as possible substitution in some cases for vacuum tubes.

The fact that a few preferred embodiments have been fully disclosed as exemplary of the utility of this invention is not intended to define the scope of said invention. Claims are appended which alone define the scope of this invention.

What is claimed is:

1. An alternating current control device comprising a magnetizable core, a first alternating current winding on said core, a second alternating current winding on said core and so disposed thereon that normally said alternating current windings are not electromagnetically coupled when said first winding is energized, and a plurality of additional windings on said core, at least one of said additional windings so disposed on said core that when same is initially energized the electromagnetic flux produced thereby in said core will effect electromagnetic coupling between said alternating current windings, at least two of said additional windings energizable out of phase with each other by said second alternating current winding, after said coupling has been effected, to effect continued electromagnetic coupling therebetween when said initial energization is removed from said one additional winding.

2. An alternating current control device comprising a magnetizable core, a first alternating current winding on said core, a second alternating current winding on said core and so disposed thereon that normally said alternating current windings are not electromagnetically coupled when said first winding is energized, and a plurality of additional windings on said core, one of said additional windings so disposed on said core that when same is initially energized the electromagnetic flux produced thereby in said core will effect electromagnetic coupling between said alternating current windings, said one additional winding and one other of said additional windings energizable out of phase with each other by said second alternating current winding, after said coupling has been effected, to effect continued electromagnetic coupling therebetween when said initial energization is removed from said one additional winding.

3. An alternating current control device comprising a magnetizable core, a first alternating current winding on said core, a second alternating current winding on said core and so disposed thereon that normally said alternating current windings are not electromagnetically coupled when said first winding is energized, and two additional windings on said core, one of said additional windings so disposed on said core that when same is initially energized the electromagnetic flux produced thereby in said core will effect electromagnetic coupling between said alternating current windings, said one additional winding and the other of said additional windings energizable out of phase with each other by said second alternating current winding, after said coupling has been effected, to effect continued electromagnetic coupling therebetween when said initial energization is removed from said one additional winding.

4. An alternating current control device comprising a plurality of separate magnetizable cores, each core carrying a first alternating current winding and a second alternating current winding so disposed on said core that normally said first and said second windings are not electromagnetically coupled when said first winding is energized, a third winding so disposed on at least one of said cores that when same is initially energized the electromagnetic flux produced thereby in said one core will effect electromagnetic coupling between said alternating current windings of said one core, and winding means on others of said cores energizable by said second alternating current winding of said one core, after said coupling has been effected, to effect electromagnetic coupling between alternating current windings of others of said cores.

5. An alternating current control device comprising a plurality of separate magnetizable cores, each core carrying a first alternating current winding and a second alternating current winding so disposed on said core that normally said first and said second windings are not electromagnetically coupled when said first winding is energized, a third winding so disposed on at least one of said cores that when same is initially energized the electromagnetic flux produced thereby in said one core will effect electromagnetic coupling between said alternating current windings of said one core, and winding means on all others of said cores energizable by said second alternating current winding of said one core, after said coupling has been effected, to effect electromagnetic coupling between alternating current windings of all others of said cores.

6. An alternating current control device comprising two separate magnetizable cores, each core carrying a first alternating current winding and a second alternating current winding so disposed on said core that normally said two windings are not electromagnetically coupled when said first winding is energized, a third winding so disposed on at least one of said two cores that when same is initially energized the electromagnetic flux produced thereby in said one core will effect electromagnetic coupling between said alternating current windings of said one core, and winding means on the second of said two cores energizable by said second alternating current winding of said one core, after said coupling has been effected, to effect electromagnetic coupling between alternating current windings of said second core.

7. An alternating current control device comprising a plurality of separate magnetizable cores, each core carrying a first alternating current winding and a second alternating current winding so disposed on said core that normally said first and said second windings are not electromagnetically coupled when said first winding is energized, a third winding so disposed on at least one of said cores that when same is initially energized the electromagnetic flux produced thereby in said one core will effect electromagnetic coupling between said alternating current windings of said one core, winding means on others of said cores energizable by said second alternating current winding of said one core, after said coupling has been effected, to effect electromagnetic coupling between alternating current windings of others of said cores, and additional winding means on each of said cores, wherein said coupling has been effected, energizable by said second alternating current windings of each of said cores, wherein said coupling has been effected, out of phase with the energization supplied from others of said cores to effect continued electromagnetic coupling between alternating current windings of each of said cores when said initial energization is removed from said third winding.

8. An alternating current control device comprising a plurality of separate magnetizable cores, each core carrying a first alternating current winding and a second alternating current winding so disposed on said core that normally said first and said second windings are not electromagnetically coupled when said first winding is energized, each of said first alternating current windings being energizable out of phase with others of said first alternating current windings, a third winding so disposed on at least one of said cores that when same is initially energized the electromagnetic flux produced thereby in said one core will effect electromagnetic coupling between said alternating current windings of said one core, winding means on others of said cores energizable by said second alternating current winding of said one core, after said coupling has been effected, to effect electromagnetic coupling between alternating current windings of others of said cores, and winding means on each of said cores, wherein said coupling has been effected, energizable by said second alternating current windings of each of said cores, wherein said coupling has been effected, to effect continued electromagnetic coupling between said coupled alternating current windings of said cores when said initial energization is removed from said third winding.

9. An alternating current control device comprising two separate magnetizable cores, each core carrying a first alternating current winding and a second alternating current winding so disposed on said core that normally said two windings are not electromagnetically coupled when said first winding is energized, a third winding so disposed on at least one of said two cores that when same is initially energized the electromagnetic flux produced thereby in said one core will effect electromagnetic coupling between said alternating current windings of said one core, winding means on the second of said two cores energizable by said second alternating current winding of said one core, after said coupling has been effected, to effect electromagnetic coupling between alternating current windings of said second core, and additional winding means on each of said cores energizable by said second alternating current windings of each of said cores out of phase with the energization supplied by the other of said cores to effect continued electromagnetic coupling between alternating current windings of both cores when said initial energization is removed from said third winding.

10. An alternating current control device comprising two separate magnetizable cores, each core carrying a first alternating current winding and a second alternating current winding so disposed on said core that normally said two windings are not electromagnetically coupled when said first winding is energized, said first windings of said two cores being energizable out of phase with each other, a third winding so disposed on at least one of said two cores that when same is initially energized the electromagnetic flux produced thereby in said one core will effect electromagnetic coupling between said alternating current windings of said one core, winding means on the second of said two cores energizable by said second alternating current winding of said one core, after said coupling has been effected, to effect electromagnetic coupling between alternating current windings of said second core, and additional winding means on each of said cores energizable by said second alternating current windings of each of said cores to effect continued electromagnetic coupling between alternating current windings of both cores when said initial energization is removed from said third winding.

11. An alternating current control device comprising two separte magnetizable cores, each core carrying a first alternating current winding and a second alternating current winding so disposed on said core that normally said two windings are not electromagnetically coupled when said first winding is energized, said first windings of said two cores being energizable in phase with each other, a third winding so disposed on at least one of said two cores that when same is initially energized the electromagnetic flux produced thereby in said one core will effect electromagnetic coupling between said alternating current windings of said one core, winding means on the second of said two cores energizable by said second alternating current winding of said one core, after said coupling has been effected, to effect electromagnetic coupling between alternating current windings of said second core, and additional winding means on each of said cores energizable by said second alternating current windings of each of said cores out of phase with the energization supplied from the other of said cores, after said coupling has been effected in each core, to effect continued electromagnetic coupling between alternating current windings of both cores when said initial energization is removed from said third winding.

DWIGHT W. GRANT.

REFERENCES CITED

The following references are of record in the file of this patent:

UNITED STATES PATENTS

| Number | Name | Date |
| --- | --- | --- |
| 1,661,740 | Stoekle | Mar. 6, 1928 |
| 1,793,213 | Dowling | Feb. 17, 1931 |
| 1,797,268 | Lee | Mar. 24, 1931 |
| 2,316,331 | Hedding | Apr. 13, 1943 |

FOREIGN PATENTS

| Number | Country | Date |
| --- | --- | --- |
| 291,101 | Great Britain | Nov. 22, 1929 |